United States Patent [19]
Konrad et al.

[11] Patent Number: 5,369,540
[45] Date of Patent: Nov. 29, 1994

[54] ELECTRIC VEHICLE DRIVE TRAIN WITH CONTACTOR PROTECTION

[75] Inventors: Charles E. Konrad; Ralph A. Benson, both of Roanoke, Va.

[73] Assignee: General Electric Company, Schenectady, N.Y.

[21] Appl. No.: 16,777

[22] Filed: Feb. 11, 1993

[51] Int. Cl.[5] .............................................. H02H 7/00
[52] U.S. Cl. .............................................. 361/6; 361/3
[58] Field of Search ...................... 361/3, 6, 15, 33, 86, 361/91

[56] References Cited

U.S. PATENT DOCUMENTS 4,449,080  5/1984  Konrad et al. ...................... 318/139

FOREIGN PATENT DOCUMENTS 2277455  1/1976  France .
3318909A1  12/1983  Germany .
2162384A  1/1986  United Kingdom .

*Primary Examiner*—A. D. Pellinen
*Assistant Examiner*—Sally C. Medley
*Attorney, Agent, or Firm*—Bell, Seltzer, Park & Gibson

[57] ABSTRACT

A drive train for an electric vehicle includes a traction battery, a power drive circuit, a main contactor for connecting and disconnecting the traction battery and the power drive circuit, a voltage detector across contacts of the main contactor, and a controller for controlling the main contactor to prevent movement of its contacts to the closed position when the voltage across the contacts exceeds a predetermined threshold, to thereby protect the contacts of the contactor. The power drive circuit includes an electric traction motor and a DC-to-AC inverter with a capacitive input filter. The controller also inhibits the power drive circuit from driving the motor and thereby discharging the input capacitor if the contacts are inadvertently opened during motoring. A precharging contactor is controlled to charge the input filter capacitor prior to closing the main contactor to further protect the contacts of the main contactor.

27 Claims, 3 Drawing Sheets

5,369,540

ELECTRIC VEHICLE DRIVE TRAIN WITH CONTACTOR PROTECTION

GOVERNMENT RIGHTS

The Government of the United States of America has rights in this invention pursuant to Contract No. DE-AC07-90ID13019 (Subcontract No. 47-2-111883) awarded by the U.S. Department of Energy.

FIELD OF THE INVENTION

The present invention relates to the field of electric vehicles, and more particularly, to a drive train for an electric vehicle including a main contactor for connecting and disconnecting a traction battery.

BACKGROUND OF THE INVENTION

Electric vehicles are receiving considerable attention as a substitute for present gasoline-fueled vehicles. This interest is based primarily on zero atmospheric emissions obtainable from an all-electric vehicle. Several states are considering stricter emissions regulations for vehicles, and California has adopted regulations that will go into effect and require zero emissions for a percentage of vehicles when operating in certain urban areas. Electric vehicles also offer other advantages including reducing dependency on imported oil, since utilities in the United States generate a large portion of their energy demands using coal, gas, nuclear, and hydroelectric energy sources.

A typical electric vehicle has a power train including a rechargeable traction battery powering one or more electric motors through a suitable power drive circuit. The traction battery typically includes a plurality of rechargeable battery cells for powering the vehicle. For example, U.S. Pat. No. 4,449,080 entitled *Electric Vehicle Protection Scheme* to Konrad et al. discloses an electric vehicle including a traction battery, a power control circuit, and a DC drive motor. The patent also discloses a main contactor including a pair of contacts connected in series with the traction battery and the power control circuit. The contactor permits the traction battery to be connected during start-up and motoring, and disconnected otherwise. In addition, the main contactor also operates in combination with a circuit fault detector to disconnect the traction battery if a fault is detected in either of a chopper circuit or a chopper bypass contactor.

While DC motors have been used in electric vehicles, there has been a reduction in the cost inverters for changing DC into AC. Accordingly, AC drive trains are now advantageously used in electric vehicles. An AC drive train offers advantages in terms of power-to-weight ratio and improved overall vehicle operating efficiency. The voltage of the traction battery is desirably relatively high, such as above 300 volts, also to provide greater efficiency. Unfortunately, this relatively high battery voltage may readily damage contacts of a contactor for connecting and disconnecting the traction battery from the DC-to-AC inverter.

In general, a larger air gap is required for contacts to interrupt current with increasing voltage. Moreover, with a DC supply, such as a typical traction battery, it is often necessary with voltages above 100 volts to incorporate a blow out coil or arc cooler to ensure that the arc will be extinguished when the contacts are opened. Such additional components add to the expense and complexity of the drive train, as well as increase the vehicle weight.

A main contactor for an electric vehicle having an AC drive is typically not intended to serve as the principle means of interruption for a circuit fault; rather, fault interruption is provided by fusing. The main contactor thus serves primarily for isolating the traction battery from the other drive train components when the vehicle is deenergized, and for connecting the battery to the power train when the vehicle is being driven. Accordingly, the function of the contactors is to make and break the circuit to the traction battery while only minimal current is flowing, and to provide a conductive path to or from the battery when the vehicle is motoring or regeneratively braking, respectively.

Typically the input to a DC-to-AC inverter includes a large filter capacitance, for example, of about 20,000 mfd. During normal operation, this capacitance is charged to a voltage essentially equal to that of the traction battery so that when the contacts are opened, no significant voltage appears across the contacts. Unfortunately, if a contactor is inadvertently opened during motoring, either due to a software error, a loose connection or other reason, the charge on the capacitive input filter is quickly depleted in a few milliseconds and the contacts are thus forced to interrupt a current with essentially full traction battery voltage impressed across the contacts. This may lead to an early failure of the contacts. In addition, other circuit components may be damaged by a high current flow resulting from the contacts being open in error.

Another problem associated with contact damage is the inadvertent closure of the contacts when the input filter capacitor of the DC-to-AC inverter is not charged to a voltage nearly equal to that of the traction battery. If the contactor is closed when the capacitor is not sufficiently charged, welding of the contacts may occur. When the contacts first touch, an immediate inrush current of substantial magnitude will flow through the contacts. In addition, it is not uncommon for the contacts to bounce open and closed several times for a few milliseconds during closure. With the high inrush current, arcing occurs which leads to localized heating and melting of tip material. When the bouncing subsides, the molten material of the contacts cools and welds the contacts together.

SUMMARY OF THE INVENTION

In view of the foregoing background, it is therefore an object of the present invention to provide a drive train for an electric vehicle and an associated method for protecting the contacts of a main contactor when moving the contacts to the closed position.

It is another object of the present invention to provide a drive train for an electric vehicle and associated method for protecting the contacts of a main contactor during an inadvertent operation of the contactor which opens the contacts of the contactor while the vehicle is motoring, or when the contacts are open in error or not properly mated when in the closed position.

These and other objects, features and advantages of the present invention are provided by a drive train including a traction battery, power drive means connected to the traction battery for driving the vehicle wheels, a main contactor having a pair of contacts electrically connected between the traction battery and the power drive means, and control means for operating the contactor to prevent the contacts from being moved to a closed position from an open position responsive to a voltage across the contacts being above a predetermined value. Accordingly, the control means includes voltage detector means for detecting a voltage across the contacts. The power drive means preferably includes a substantially capacitive input filter and a gated DC-to-AC inverter for driving the electric motor. Thus, one feature of the present invention uses control means for operating the main contactor to prevent a relatively large voltage from being impressed across the contacts by the capacitive input filter when closing the contacts, as when initially starting or energizing the vehicle.

A typical traction battery, may have a voltage of over 300 volts DC and be capable of delivering over 200 amps. Accordingly, a contactor sized to operate with such a power flow would be unduly large and heavy for an electric vehicle, and, moreover, would require additional components to reduce arcing between the contacts. The present invention overcomes this limitation by charging the capacitive input filter of the DC-to-AC inverter prior to closing the main contactor. Accordingly, a contactor having a lower capacity may therefore be used, while fuses may be used to provide the primary means for interrupting circuit faults.

Another feature of the present invention is that the control means preferably includes means for inhibiting the DC-to-AC inverter from delivering power to the electric motor responsive to a detected voltage across the contacts exceeding a predetermined value or threshold. In particular, an unplanned contactor opening during motoring, due to software errors, loose contactor connections or any other reason, may discharge the input filter capacitor through the DC-to-AC inverter in just a few milliseconds. Thus, the contacts would be required to interrupt a current with essentially full traction battery voltage impressed across the contacts. Such stress would lead to early contactor failure. The present invention overcomes this shortcoming by reducing discharge of the capacitive input filter, thus, allowing the filter to retain a relatively high charge and thereby impose a voltage substantially less than the full traction battery across the contacts as the contacts are opened.

To permit closure of the contacts without an unduly large voltage appearing across the contacts as when initially starting the vehicle, precharging means is provided to reduce the voltage across the contacts by charging the capacitive input filter of the DC-to-AC inverter. The control means preferably operates the precharging means when the capacitive input filter is discharged, as during initial starting of the vehicle, and prior to closing the contacts. Thus, the capacitive input filter may be charged to a voltage substantially equal to the voltage of the traction battery to prevent damage to the contacts of the main contactor.

The precharging means preferably includes a precharging contactor for connecting the traction battery to the capacitive input filter. The traction battery preferably includes first and second, or plus and minus, battery terminals. Accordingly, the contacts of the main contactor may be connected in series with the first battery terminal and the capacitive input filter, while the contacts of the precharging contactor are connected in series with the second battery terminal and the capacitive input filter. A precharging resistor is connected in series with the contacts of the precharging contactor to facilitate charging of the capacitive input filter when the precharging contacts are closed and the main contacts are opened.

A failure to close the contacts of the main contactor or an inadvertent opening of the contacts during motoring may also draw a relatively high current through the precharging resistor, thereby damaging the resistor. Accordingly, the control means overcomes this potential problem by detecting a voltage across the contacts of the main contactor and inhibiting the DC-to-AC inverter from drawing potentially damaging current from the traction battery through the precharging resistor.

The voltage detected across the contacts may also be used to protect the contacts during a partial failure of the contactor, as when the full surface areas of the respective contacts are not properly mated. Such partial failure may result from a degradation of an associated drive transistor of the contactor, from a reduction in the spring bias of an arm of the contactor thereby reducing pressure on the contacts, or from wear or pitting of the surfaces of the contacts. When the contacts are not properly mated, a voltage drop across the contacts develops thereby causing localized heating and the possibility of welding the contacts together. Accordingly, the control means may also preferably include means for operating the contactor to move the contacts to the open position when a sufficiently large voltage across the contacts is detected when the contacts are in the closed position.

Returning again to the precharging means, the precharging means also preferably includes means for detecting a voltage across the contacts of the precharging contactor. The control means further includes means for inhibiting the power drive means from discharging its capacitive input filter responsive to the voltage across the contacts of the precharging contactor being above a predetermined value.

As would be readily understood by those skilled in the art the features of the invention for protecting contacts during closure or inadvertent opening may be advantageously combined to provide a comprehensive scheme for protecting contacts for the main contactor and thereby permit use of a relatively small, lightweight, and reliable main contactor. Accordingly, vehicle reliability is also increased.

A method aspect of the present invention includes the steps of detecting a voltage across the contacts of the main contactor, and controlling the main contactor to prevent the contacts from being moved to the closed position from the open position responsive to a voltage across the contacts being above a predetermined threshold. As discussed above, the power drive means preferably includes a substantially capacitive input filter and, thus, the method preferably also includes the step of inhibiting the power drive means from delivering power to the electric motor responsive to a voltage across the contacts exceeding a predetermined threshold. Accordingly, discharge of the capacitive input filter is prevented and a voltage impressed across the contacts is reduced when the contacts move from the closed position to the open position.

The voltage across the contacts may also be detected when the contacts are in the closed position. If the voltage exceeds a predetermined threshold, the main contactor may be opened to prevent damage to the contacts.

The capacitive input filter is also preferably precharged to a predetermined threshold prior to operating the contactor to move the contacts from the open position to the closed position. In addition, the method preferably includes the steps of detecting a voltage across the contacts of the precharging contactor, and inhibiting the power drive means from powering the motor and thereby discharging the capacitive input filter of the power drive means.

DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiment set forth herein. Rather, applicants provide these embodiments so that this disclosure will be thorough and complete, and will fully convey the scope of the invention to those skilled in the art. Like numbers refer to like elements throughout.

Figure 1:
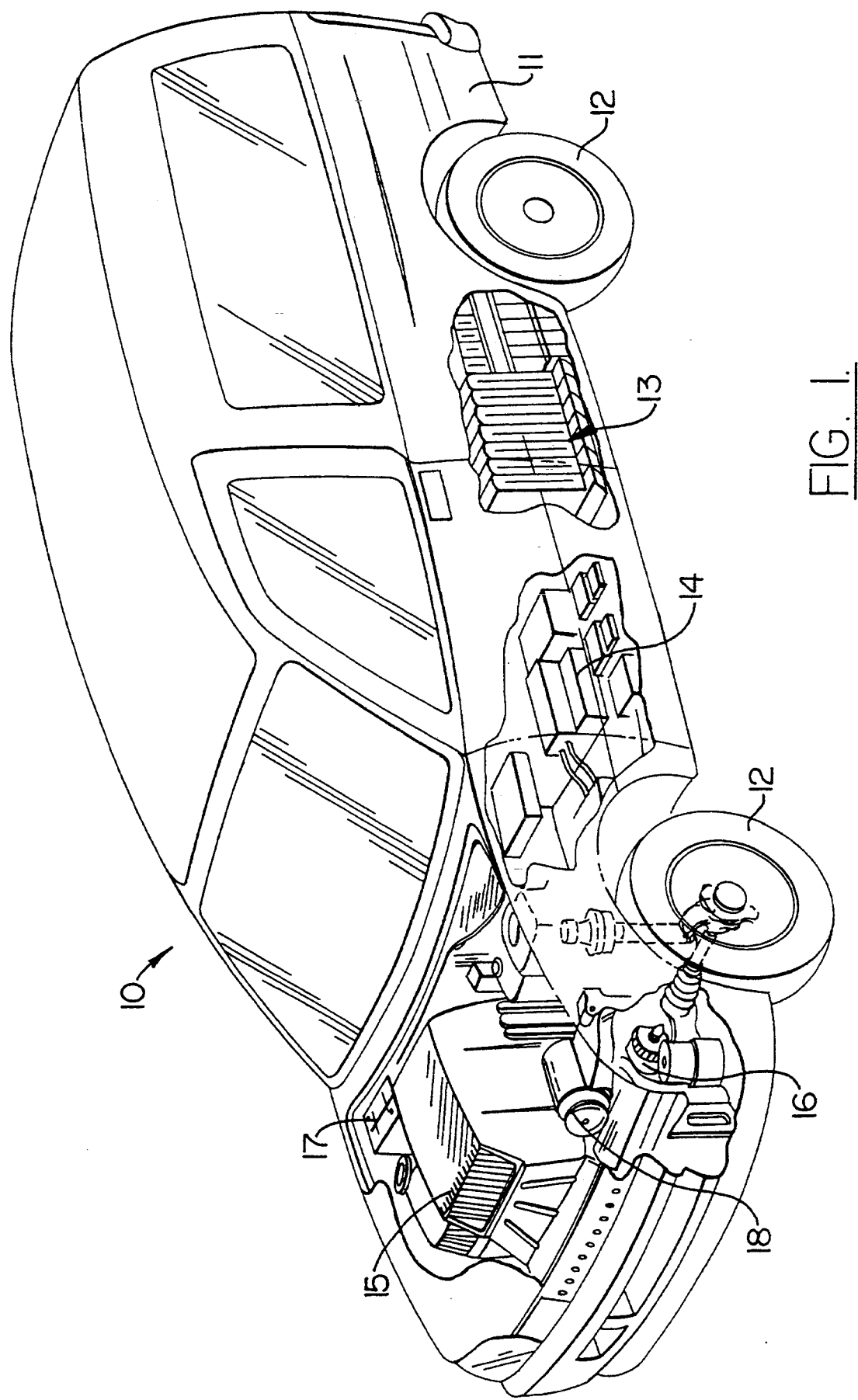
FIG. 1 is a perspective schematic view of an electric vehicle including the drive train according to the present invention.

Referring first to FIG. 1 the drive train and its associated components according to the invention are illustrated installed in an electric vehicle 10. The vehicle 10 includes a body 11 that may be carried by a separate supporting frame, or the vehicle may be of unibody construction thereby having a body with an integral frame, as would be readily understood by those skilled in the art. The vehicle's wheels 12 are rotatably mounted to the frame. As would also be readily understood by those skilled in the art, in addition to applicability to an all-electric vehicle 10 as described herein, the drive train according to the present invention may also have applicability to hybrid types of electric vehicles which include an additional power source, such as an internal combustion engine.

A traction battery 13 is carried by the frame of the vehicle 10 in a lower medial and rearward portion to thus provide a lower center of gravity and more even weight distribution between the front and rear wheels. As would be readily appreciated by those skilled in the art, the traction battery 13 preferably comprises a plurality of rechargeable interconnected battery cells. In particular, the traction battery 13 desirably has a relatively high voltage in the range of about 300 to 350 volts and, for a typical vehicle, may be able to supply a current in the range of about 200 to 250 amps.

The vehicle 10 preferably includes a Vehicle Control Unit (VCU) 14 which, among other tasks, determines and sends a desired torque request signal to a control computer for a DC-to-AC inverter. Both the DC-to-AC inverter and its associated control computer are enclosed within a protective housing 15 under the hood of the vehicle. The desired torque request signal is processed by the control computer for the DC-to-AC inverter to drive the electric motor 16 to the desired torque output. The vehicle 10 may also preferably include other related components, such as a twelve volt accessory battery 17 and an electrically-powered air conditioning compressor 18.

Figure 2:
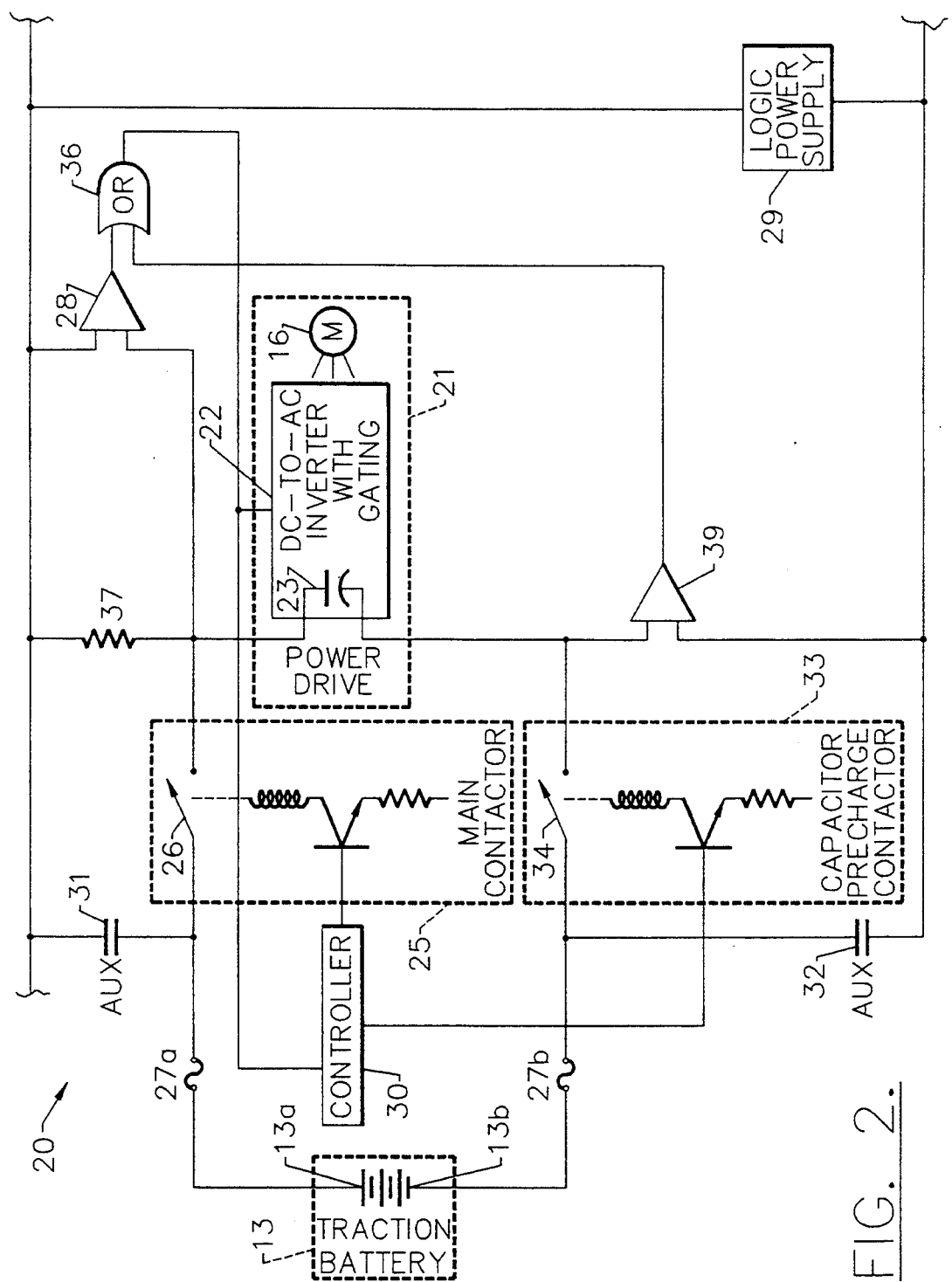
FIG. 2 is an electrical schematic diagram of the drive train according to the present invention.

Referring now to the schematic diagram of FIG. 2 the circuit and operation of the drive train 20 according to the present invention is explained. The drive train 21 includes a traction battery 13, and power drive means 21 connected to traction battery for driving one or more wheels of the vehicle. The power drive means 21 is preferably provided by a DC-to-AC inverter 22 with a substantially capacitive input filter 23. The DC-to-AC inverter 22 preferably includes gating means for permitting control of power delivered to said electric motor 16 and, thereby, to also control discharge of the capacitive input filter 23 of the DC-to-AC inverter.

The drive train 20 includes a main contactor 25 having a pair of contacts 26 electrically connected in series with a first terminal 13a of the traction battery 13 and the capacitive input filter 23 of the power drive means 21. The contacts 26 of the main contactor 25 are movable between a closed position and an open position for respectively connecting and disconnecting the traction battery 13 and the power drive means 21.

The main contactor 25 is not intended as the primary means of circuit fault isolation; rather, such fault isolation is provided by fuse means, in turn, preferably provided by respective fuses 27a and 27b in the circuit legs from the traction battery 13. Accordingly, and as discussed below in greater detail, an advantage of the present invention is that the main contactor 25 and its associated contacts 26 preferably have a capacity considerably less than would be needed to close the contacts 26 with the full traction battery voltage thereacross, and less than would be required to repeatedly interrupt the current flow from the battery during motoring.

The drive train 20 also includes voltage detecting means connected to the main contactor 25 across its contacts 26 for detecting a voltage across the contacts. As shown in the illustrated embodiment, the detecting means may be provided by a first comparator 28 powered by a logic power supply 29. The comparator 28 compares the voltage across the contacts 26 to a predetermined reference, or threshold, voltage.

A controller 30 and the voltage detecting means provide control means for operating the main contactor 25 to prevent the contacts 26 from being moved to the closed position from the open position responsive to a voltage across the contacts being above a predetermined threshold. For a traction battery having a voltage in the range of about 300 to 350 volts, the contacts 26 would typically not be closed unless the voltage thereacross was less than about 50 volts, or about 15% of the full voltage of the traction battery 13.

The controller 30 may preferably be provided by a microprocessor operating under stored program control, and may be readily incorporated into the VCU 14 (FIG. 1). As would be readily understood by those skilled in the art, the voltage detection and comparing functions may readily be incorporated into a microprocessor operating under stored program control without requiring a comparator or other discrete logic gates.

The monitoring of the voltage across the contacts 26 may also be used to protect the contacts during a partial failure when the surface areas of the respective contacts are not properly mated. Such partial failure may result from a degradation of the associated drive transistor of the contactor 25, from a reduction in the spring bias of an arm of the contactor, or from wear or pitting of the surfaces of the contacts. When the contacts 26 are not properly mated, a voltage drop across the contacts develops thereby causing localized heating and the possibility of welding the contacts together. Accordingly, the controller may also preferably operate the main contactor 25 to move the contacts 26 to the open position when a sufficiently large voltage across the contacts is detected. For example, a continuous voltage of about 10 volts may damage the contacts 26 when in the closed position and, hence, may be used to trigger opening of the contacts.

The drive train 20 also preferable includes precharging means cooperating with the controller 30 to first charge the capacitive input filter 23 prior to operating the main contactor 25 to close its contacts 26. The capacitive input filter 23 is chargeable to a voltage substantially the same as the output voltage of the traction battery 13. Precharging the capacitive input filter 23 would typically be initiated when the driver enters the vehicle and operates the equivalent of an ignition switch (not shown). This "starting" of the vehicle will preferably trigger certain vehicle diagnostics and also close the auxiliary contacts 31 and 32.

The precharging means includes a precharging contactor 33 with a set of movable contacts 34. The precharging contactor 33 is also operable by the controller 30. The contacts 34 of the precharging contactor 33 are connected in series with a second battery terminal 13b and the capacitive input filter 23. The precharging means also preferably includes a precharging resistor 37 connected in series with the capacitive input filter 23 and the first battery terminal 13a as illustrated.

An unplanned or inadvertent opening of the main contactor 25 during motoring, due to software errors, loose contactor connections or any other reason, may discharge the capacitive input filter 23 through the DC-to-AC inverter 22 in just a few milliseconds. Thus, the contacts 26 would be forced to interrupt a current with essentially full traction battery voltage impressed thereacross which may damage the contacts 26. The present invention overcomes this disadvantage by reducing discharge of the capacitive input filter 23, thus, allowing the contacts 26 to open with a voltage substantially less than the full traction voltage battery imposed across the contacts.

Accordingly, another feature of the present invention is that the control means includes means for inhibiting the DC-to-AC inverter 22 from delivering power to the electric motor responsive to a detected voltage across the contacts 26 of the main contactor 25 exceeding a predetermined value. If a predetermined voltage across the contacts 26 is exceeded, as when the contactor 25 inadvertently opens during motoring, the DC-to-AC inverter 22 is inhibited from supplying load to the motor 16 to thereby prevent discharging of the capacitive input filter 23. Accordingly, the contacts 26 are protected from interrupting the full traction battery voltage. In addition, by inhibiting the DC-to-AC inverter, high and potentially damaging current flow through the precharging resistor 37 is avoided when the contacts 26 of the main contactor 25 are open in error.

As shown in the illustrated embodiment, the DC-to-AC inverter may be inhibited by the output signal of the logical "or" gate 36 which is applied to both the gating means of the DC-to-AC inverter 22 and the controller 30. The input of the "or" gate 36 is connected to the output of the first comparator 28 as illustrated. As also illustrated, a second comparator 39 may be connected across the contacts 34 of the precharging contactor 33 so that the DC-to-AC inverter 22 will be gated off, or inhibited, if either comparator 28 or 39 detects an undesirably high voltage across its respective contacts. As would readily be understood by those skilled in the art, the comparators 28, 39 and "or" gate 36 illustrate one implementation of this aspect of the present invention, while many others are possible including suitable voltage sensors cooperating with a microprocessor for detecting respective voltages and comparing the detected voltages to respective thresholds.

Figure 3:
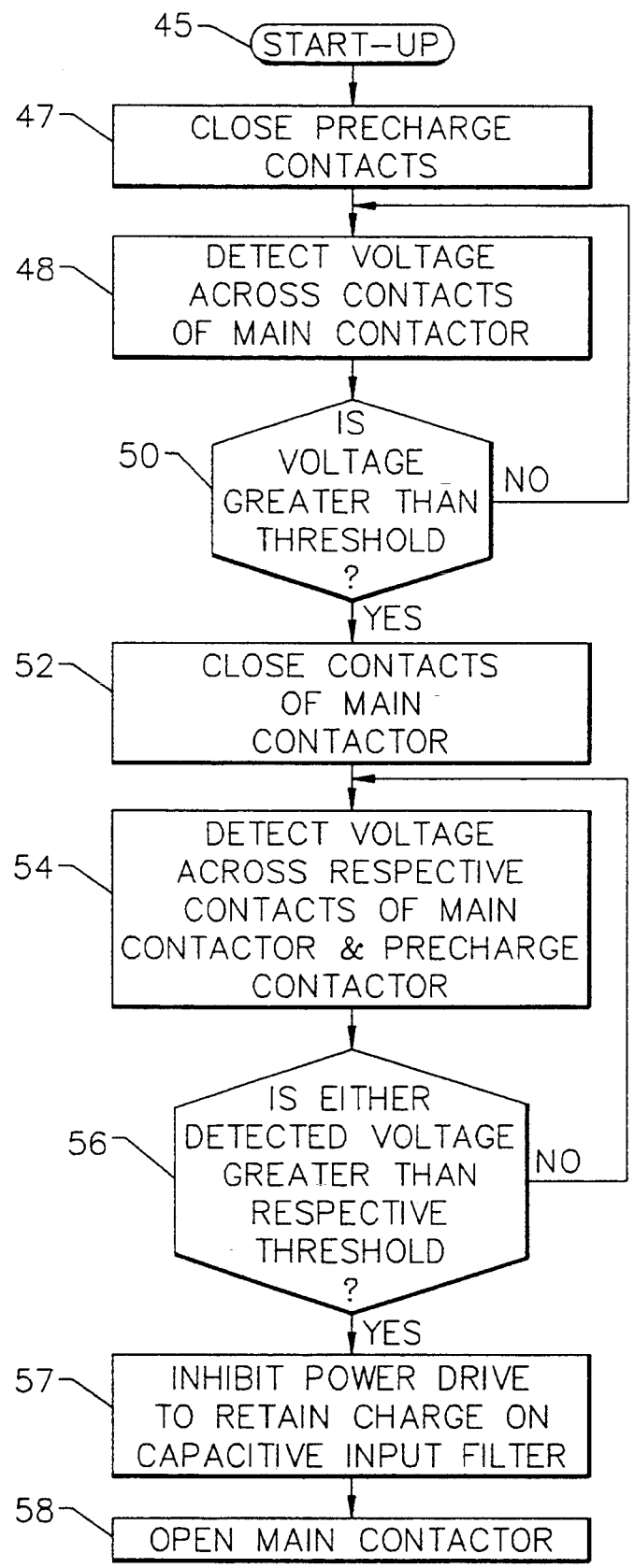
FIG. 3 is a flow chart block diagram illustrating operation of the drive train according to the invention.

Referring now to the flow chart of FIG. 3, the method of operating a drive train according to the present invention is explained. After the vehicle is energized, or started, (Block 45) the contacts of the precharging contactor are closed at Block 47 to thereby begin charging of the capacitive input filter of the DC-to-AC inverter.

The voltage across the contacts of the main contactor is monitored at Block 48, and, if the voltage is below a predetermined value, such as about 15% of the traction battery voltage, the main contactor is operated to close its contacts (Blocks 50 and 52). The 15% full battery voltage across the contacts corresponds to a precharge of about 85% on the capacitive input filter. The vehicle is then driven according to the desired torque requested by the VCU. Fusing preferably provides the primary means of interrupting any faults occurring in the circuit.

As shown in Block 54, the voltage across the contacts of the main contactor is detected, and also optionally the voltage across the contacts of the precharging contactor is detected (Block 54). If a voltage above a predetermined value is detected at Block 56, the DC-to-AC inverter is appropriately gated to inhibit supplying power to the electric motor, and thereby preserving charge on the capacitive input filter of the DC-to-AC inverter (Block 57) and protecting the precharging resistor. If the contacts of the main contactor were not already opened, the controller may open the contacts of the main contactor (Block 58) to protect the contacts for the case where the contacts are closed, but not properly mated.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A drive train for an electric vehicle, said drive train comprising:

a traction battery;

power drive means connected to said traction battery for driving one or more wheels of the vehicle, said power drive means comprising an electric motor, gating means for permitting control of power delivered to said electric motor from said traction battery, said gating means comprising a substantially capacitive input filter;

a main contactor having a pair of contacts electrically connected between said traction battery and said capacitive input filter of said power drive means, said contacts being movable between a closed position and an open position for respectively connecting and disconnecting said traction battery and said power drive means;

precharging means connected to said traction battery and said capacitive input filter for charging said capacitive input filter when said contacts are in the open position; and control means connected to said main contactor for operating said main contactor to move said contacts to one of the open position and the closed position, said control means comprising precharging control means cooperating with said precharging means for charging said capacitive input filter prior to moving said contacts to the closed position from the open position, voltage detecting means for detecting a voltage across said contacts, and means responsive to said voltage detecting means for operating said contactor to prevent said contacts from being moved to the closed position from the open position responsive to a voltage across said contacts exceeding a predetermined value.

2. A drive train according to claim 1 wherein said control means power drive inhibit control further comprises means cooperating with said gating means for inhibiting said power drive means from delivering power to said electric motor responsive to a voltage across said contacts exceeding a predetermined value to prevent discharge of said capacitive input filter and to thereby reduce a voltage impressed across said contacts when said contacts move from the closed position to the open position.

3. A drive train according to claim 1 wherein said traction battery includes first and second battery terminals; wherein said contacts of said main contactor are electrically connected in series between said first battery terminal and said capacitive input filter; and wherein said precharging means comprises a precharging contactor having a pair of contacts electrically connected in series between the second battery terminal and said capacitive input filter, and a precharging resistor electrically connected in series with said contacts of said precharging contactor.

4. A drive train according to claim 3 wherein said control power drive inhibit precharge control means further comprises means for detecting a voltage across said contacts of said precharging contactor, and means cooperating with said gating means for inhibiting said power drive means from delivering power to said electric motor responsive to a voltage across said contacts of said precharging contactor exceeding a predetermined value to prevent discharge of said capacitive input filter and to thereby reduce a voltage impressed across said contacts of said precharging contactor when said contacts move from the closed position to the open position.

5. A drive train according to claim 1 wherein said control means further comprises means responsive to said voltage detecting means for operating said main contactor to move said contacts from the closed position to the open position responsive to a voltage across said contacts exceeding a predetermined voltage when said contacts are in the closed position.

6. A drive train according to claim 1 wherein said power drive means comprises a DC-to-AC inverter.

7. A drive train according to claim 1 further comprising fuse means connected in series with said traction battery and said contacts for fault interruption.

8. A drive train according to claim 1 wherein said voltage detecting means comprises a comparator for comparing a voltage across said contacts to the predetermined value.

9. A power drive train according to claim 1 wherein said traction battery has a predetermined output voltage; and wherein said capacitive input filter is chargeable to a voltage substantially the same as said predetermined output voltage of said traction battery.

10. A drive train for an electric vehicle, said drive train comprising:

a traction battery;

power drive means connected to said traction battery for driving one or more wheels of the vehicle, said power drive means comprising an electric motor, gating means for permitting control of power delivered to said electric motor, said gating means comprising a substantially capacitive input filter;

a main contactor having a pair of contacts electrically connected between said traction battery and said capacitive input filter, said contacts being movable between a closed position and an open position for respectively connecting and disconnecting said traction battery and said power drive means; and control means connected to said main contactor for operating said main contactor to move said contacts to one of the open position and the closed position, said control means comprising voltage detecting means for detecting a voltage across said contacts, and power drive inhibit control means connected to said gating means and responsive to said voltage detecting means for inhibiting said power drive means from delivering power to said electric motor responsive to a voltage across said contacts exceeding a predetermined value to prevent discharge of said capacitive input filter and to thereby reduce a voltage impressed across said contacts when said contacts move from the closed position to the open position.

11. A drive train according to claim 10 wherein said control means further comprises means for operating said main contactor to move said contacts from the closed position to the open position responsive to a voltage across said contacts exceeding a predetermined value when said contacts are in the closed position.

12. A drive train according to claim 10 further comprising precharging means electrically connected to said traction battery and said capacitive input filter for charging said capacitive input filter when said contacts are in the open position; and wherein said control precharging control means further comprises means cooperating with said precharging means for charging said capacitive input filter prior to moving said contacts to the closed position from the open position.

13. A drive train according to claim 12 wherein said traction battery includes first and second battery terminals; wherein said contacts of said main contactor are connected in series between said first battery terminal and said capacitive input filter; and wherein said precharging means comprises a precharging contactor having a pair of contacts connected in series between the second battery terminal and said capacitive input filter, and a precharging resistor electrically connected in series with said contacts of said precharging contactor.

14. A drive train according to claim 13 wherein said control means further comprises means for detecting a voltage across said contacts of said precharging contactor, and power drive inhibit precharge control means cooperating with said gating means for inhibiting said power drive means from delivering power to said electric motor responsive to a voltage across said contacts of said precharging contactor exceeding a predetermined value to prevent discharge of said capacitive input filter and to thereby reduce a voltage impressed across said contacts of said precharging contactor when said contacts move from the closed position to the open position.

15. A drive train according to claim 10 wherein said power drive means comprises a DC-to-AC inverter.

16. A drive train according to claim 10 further comprising fuse means connected in series with said traction battery and said contacts for fault interruption.

17. A drive train according to claim 10 wherein said detecting means comprises a comparator for comparing a voltage across said contacts to the predetermined value.

18. A drive train according to claim 10 wherein said traction battery has a predetermined output voltage, and wherein said capacitive input filter is chargeable to a voltage substantially the same as said predetermined output voltage of said traction battery.

19. An electric vehicle comprising:
a frame;
one or more wheels rotatably mounted on said frame;
a traction battery carried by said frame;
power drive means connected to said traction battery for driving one or more wheels of the vehicle, said power drive means comprising an electric motor, gating means for permitting control of power delivered to said electric motor from said traction battery, said gating means comprising a substantially capacitive input filter;
a main contactor having a pair of contacts electrically connected between said traction battery and said capacitive input filter of said power drive means, said contacts being movable between a closed position and an open position for respectively connecting and disconnecting said traction battery and said power drive means;
precharging means connected to said traction battery and said capacitive input filter for charging said capacitive input filter when said contacts are in the open position; and
control means connected to said main contactor for operating said main contactor to move said contacts to one of the open position and the closed position, said control means comprising precharging control means cooperating with said precharging means for charging said capacitive input filter prior to moving said contacts to the closed position from the open position, voltage detecting means for detecting a voltage across said contacts, and means responsive to said voltage detecting means for operating said contactor to prevent said contacts from being moved to the closed position from the open position responsive to a voltage across said contacts exceeding a predetermined value.

20. An electric vehicle according to claim 19 wherein said control power drive inhibit control means further comprises means cooperating with said gating means for inhibiting said power drive means from delivering power to said electric motor responsive to a voltage across said contacts exceeding a predetermined value to prevent discharge of said capacitive input filter and to thereby reduce a voltage impressed across said contacts when said contacts move from the closed position to the open position.

21. An electric vehicle according to claim 19 wherein said control power drive inhibit precharge control means further comprises means for detecting a voltage across said contacts of said precharging contactor, and means cooperating with said gating means for inhibiting said power drive means from delivering power to said electric motor responsive to a voltage across said contacts of said precharging contactor exceeding a predetermined value to prevent discharge of said capacitive input filter and to thereby reduce a voltage impressed across said contacts of said precharging contactor when said contacts move from the closed position to the open position.

22. An electric vehicle according to claim 19 wherein said control means further comprises means for operating said main contactor to move said contacts from the closed position to the open position responsive to a voltage across said contacts exceeding a predetermined voltage when said contacts are in the closed position.

23. An electric vehicle according to claim 19 wherein said power drive means comprises a DC-to-AC inverter.

24. A method for operating an electric vehicle drive train including a traction battery; power drive means connected to the traction battery for driving one or more wheels of the vehicle, the power drive means including a substantially capacitive input filter; and a main contactor having a pair of contacts electrically connected between the traction battery and the capacitive input filter of the power drive means, the contacts being movable between a closed position and an open position for respectively connecting and disconnecting the traction battery and the power drive means; said method comprising the steps of:
detecting a voltage across the contacts of the main contactor;
precharging the capacitive input filter to a predetermined value prior to controlling the main contactor to move the contacts from the open position to the closed position; and
controlling the main contactor to prevent the contacts from being moved to the closed position from the open position responsive to a voltage across the contacts being above a predetermined value.

25. A method according to claim 24 further comprising the step of inhibiting the power drive means from delivering power to the electric motor responsive to a voltage across the contacts exceeding a predetermined value to prevent discharge of the capacitive input filter and to thereby reduce a voltage impressed across the contacts when the contacts move from the closed position to the open position.

26. A method according to claim 24 wherein the step of detecting a voltage across the contacts of the main contactor comprises comparing a voltage across the contacts to the predetermined value.

27. A method according to claim 24 further comprising the step of operating the main contactor to move the contacts to the open position from the closed position responsive to a voltage across the contacts in a closed position exceeding a predetermined value.

* * * * *